3,523,958
4 - ALKYL - 6 - DEHYDRO - TESTOSTERONE AND INTERMEDIATES IN THE PRODUCTION THEREOF
Engbert Harmen Reerink, Pieter Westerhof, and Hendrik Frederik Louis Scholer, Van Houtenlaan, Weesp, Netherlands, assignors, by mesne assignments, to U.S. Philips Corporation, New York, N.Y., a corporation of Delaware
No Drawing. Continuation-in-part of application Ser. No. 472,726, July 16, 1965. This application June 7, 1968, Ser. No. 735,166
Int. Cl. C07c 169/22
U.S. Cl. 260—397.4   6 Claims

ABSTRACT OF THE DISCLOSURE 4,17 dialkyl $9\beta,10\alpha$ steroids of the androstane series having 2–5 carbon atoms in the 4-alkyl group and a keto, alkoxy or acyloxy group at the 3-position. Examples are 4-ethyl-17$\alpha$ - methyl - 17$\beta$ - hydroxy-$9\beta,10\alpha$-androsta-4,6-dien-3-one and 4,4-diethyl - 17$\alpha$ - methyl-17$\beta$-hydroxy-$9\beta$, 10$\alpha$-androst-5-en-3-one. These compounds have hormonal activities and in general have been found to have antigonadotrophic activities.

---

This application is a continuation-in-part of our parent application Ser. No. 472,726, filed July 16, 1965, now abandoned.

The invention in this application relates to a new and novel group of steroids of the $9\beta,10\alpha$ androstane series substituted by alkyls at the 4 and 17 positions. More particularly, the invention in this application relates to novel 4,17-dialkyl $9\beta,10\alpha$ steroids of the formula:

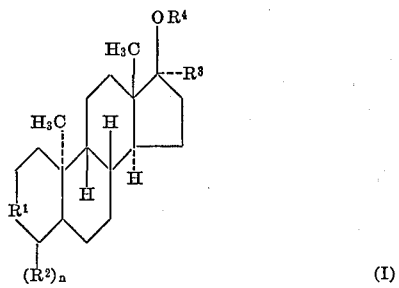

(I)

wherein $n$ is a whole number from 1 to 2 inclusive, $R^1$ is a moiety selected from the group consisting of the 3-keto-$\Delta^4$, 3-keto-$\Delta^{4,6}$-, 3-keto-$\Delta^{1,4}$-, 3-keto-$\Delta^{1,4,6}$-, 3-alkoxy-$\Delta^{3,5}$-, 3-acyloxy-$\Delta^{3,5}$ and 3-acyloxy-$\Delta^{2,4,6}$ only when $n=1$ and $R^1$ is 3-keto-$\Delta^5$ when $n=2$, $R^2$ is lower alkyl of 2–5 carbon atoms inclusive, $R^3$ is lower alkyl and $R^4$ is a member selected from the group consisting of hydrogen, lower alkyl and acyl.

In the $9\beta,10\alpha$-steroids of the above Formula I the hydrogen atoms in the 8- and 9-positions as well as the 13-methyl group show the $\beta$-configuration and the 14-hydrogen atom and the 10-methyl group the $\alpha$-configuration.

Consequently there exists a deviation from the normal steroids with respect to the configuration of the 9-hydrogen atom and the 10-methyl group.

The alkyl group in a 3-alkoxy or 17-alkoxy group, if present, is preferably an aliphatic, cycloaliphatic or araliphatic alkyl group with 1–10 C-atoms. Examples of such group are: methyl, ethyl, propyl, tert. butyl, cyclopentyl, cyclohexyl and benzyl. Further examples of etherified 17-hydroxy groups are cyclopenten-(1)-yloxy, 1'-ethoxy-cyclopentoxy and tetrahydro-pyranyloxy.

The acyl group in a 3-acyloxy or 17-acyloxy group, if present, is preferably derived from a saturated or unsaturated aliphatic, cycloaliphatic, an araliphatic or an aromatic carboxylic acid containing 1–20 C-atoms. Examples of such acids are: formic acid, acetic acid, pivalic acid, propionic acid, butyric acid, caproic acid, enanthic acidic, oleic acid, palmitic acid, stearic acid, succinic acid, malonic acid, citric acid, benzoic acid.

The alkyl group in the 4-position are preferably lower alkyl groups containing 2–5 C-atoms. Examples of such groups are ethyl, propyl, isopropyl, butyl, isobutyl and amyl.

The alkyl group present in the 17$\alpha$ position is lower alkyl preferably of 1–5 carbon atoms. Examples are methyl, ethyl, propyl, isopropyl, butyl, isobutyl and aryl.

The 4-alkyl-$9\beta,10\alpha$-steroids of the general Formula I can be obtained according to methods known for the manufacture of the corresponding normal 4-alkyl steroids, for example, as follows:

(a) A 3-keto-steroid of the partial structure (1) is, for example, reacted with ethyl formate and a base such as sodium hydride or sodium methylate, to give the 4-hydroxymethylene compound (2) which is then alkylated with an alkyl halide (e.g. with methyl iodide) in the presence of a base (e.g. sodium methylate or sodium hydride) to give the compound (3). By splitting off the formyl group (e.g. by means of weak bases such as basic aluminum oxide) a 3-keto-4-$R^2$-steroid of partial Formula 4 is obtained which is converted to the 3-keto-$\Delta^4$-4-$R^2$-steroid of the partial Formula 6 by bromination to give the compound (5) and subsequent splitting off of hydrogen bromide (see U.S. Pats. No. 2,981,743 and No. 3,018,285).

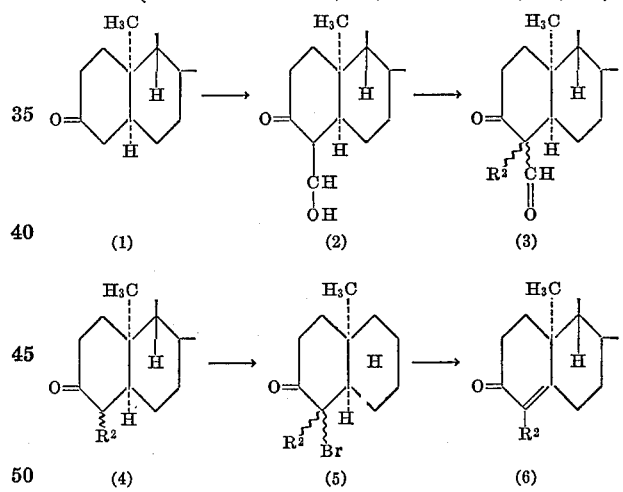

(b) A 3-keto-steroid of the partial structure (1) is reacted with an oxalic acid ester (e.g. with ethyl oxalate) in the presence of a base (e.g. sodium hydride or sodium methylate) to give the 4-oxalyl compound (7) which is treated with an alkyl halide (e.g. methyl iodide). The so-obtained compound (8) is treated with a base (e.g. sodium ethylate) to give the 3-keto-4-$R^2$-steroid (4) (see, for example, U.S. Pat. No. 2,844,602). The latter compound can be converted into a 3-keto-$\Delta^4$-4-$R^2$-steroid of the partial Formula 6 as described sub (a).

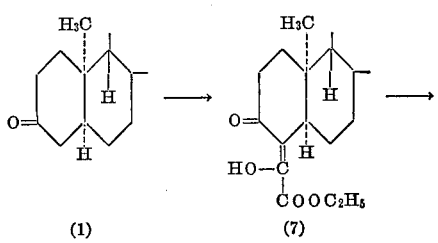

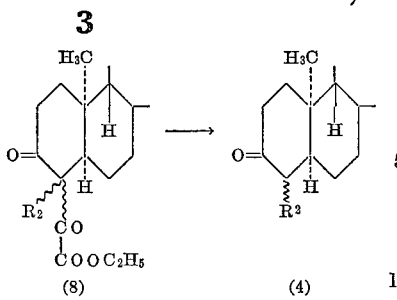

(c) A 2-hydroxymethylene compound of partial structure (9) is converted into the thioketal (10) (e.g. with trimethylenethio p-toluene-sulphonate), the thioketal (10) obtained is reacted with an alkyl halide (e.g. with methyl iodide and potassium tert. butylate to give the compound (11). The latter is desulphurized (e.g. with Raney nickel) to give the compound (12) (see, for example, Beton et al., Soc., 1957, 735). The 3-keto-$\Delta^4$-4-$R^2$-steroid of the partial Formula 6 is obtained by bromination and dehydrobromination. The starting 2-hydroxymethylene compound (9) can be obtained from a corresponding 3-keto-steroid with a formate (such as ethyl formate and a base (such as sodium methylate).

The 3-pyrrolidyl-enamine of the partial Formula 15 can be obtained from the corresponding 3-keto-$\Delta^4$-steroid by reaction with pyrrolidine in a manner known per se. Instead of pyrrolidine, other secondary cyclic amines (e.g. morpholine, piperidine, etc.) can also be used for the formation of the enamine. The alkylation of the 3-enamine of the partial Formula 15 is preferably effected in the presence of an organic solvent such as ethanol, methanol, ethyl acetate and especially dimethyl-formamide. The iodides or bromides are the preferred halide. The hydrolysis of the 3-enamine grouping for the purpose of reintroducing the original 3-keto-$\Delta^4$-grouping can be effected in a manner known per se, e.g. with water, aqueous acids or bases (for example with a solution of sodium hydroxide in aqueous methanol) or can also take place directly in the course of the alkylation or aralkylation reaction (for example, when using dimethyl-formamide as the solvent).

(f) A 3-keto-$\Delta^4$-steroid of the partial structure (16) is converted by means of formaldehyde and a thiol (e.g. an aliphatic, aromatic, alicyclic or heterocyclic thiol such as ethylmercaptan, thiophenol, cyclohexylmercaptan, pyridylmercaptan) in the presence of a base, especially an organic base such as a tertiary amine (e.g. a trialkyl amine) into a thiomethyl ether, for example the phenyl-

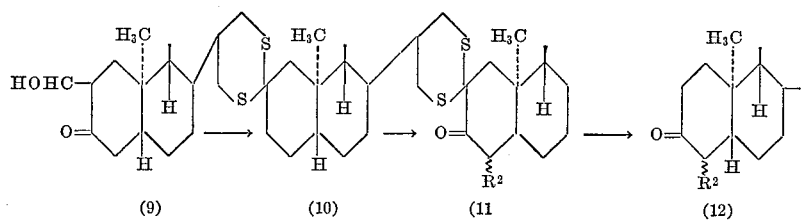 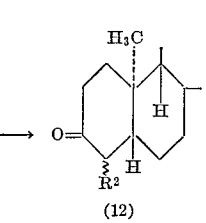

(d) A 3-acyloxy-4,5-epoxy-steroid of the partial structure (13) is reacted with an alkyl magnesium halide (e.g. with ethyl magnesium bromide) to give a compound of the partial Formula 14 (see, for example, Bull. Soc. Chim., 1963, 6, 1223), which is thereupon oxidised to the corresponding 3 - keto-4-$R^2$-steroid (e.g. with chromic acid). Dehydration of this compound with acids (e.g. dilute mineral acids such as dilute sulphuric acid) leads to the 3-keto-$\Delta^4$-$R^2$-compound (6).

thiomethyl ether of the partial Formula 17. The latter compound is reductively desulphurized to the $\Delta^4$-4-methyl compound of the partial Formula 18 (e.g. with deactivated Raney nickel) (see, for example, Chem. Soc., 1962, 1091).

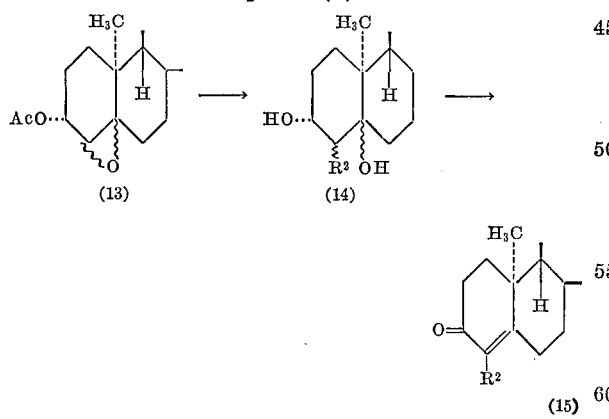

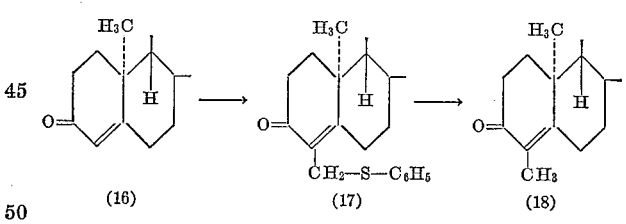

(e) A 3-enamine (e.g. a 3-pyrrolidyl-enamine) of the partial structure (15) is reacted with an alkylating agent (e.g. an alkyl halide $R^2X$) and the reaction product is hydrolysed to the 3-keto-$\Delta^4$-4-$R^2$-steroid of partial Formula 6 (see, for example, U.S. Pat. No. 3,102,896).

(g) A 3-keto-$\Delta^4$-steroid of the partial Formula 16 is reacted with an alkylating agent (for example, an alkyl or aralkyl halogenide $R^2X$, especially an alkyl iodide or bromide or an arakyl chloride) in the presence of a proton acceptor such as potassium tert. butylate in tert. butanol, to give the 3-keto-$\Delta^4$-4-$R^2$-steroid (6) (see, for example, J. Am. Chem. Soc., 1963, 85, 196).

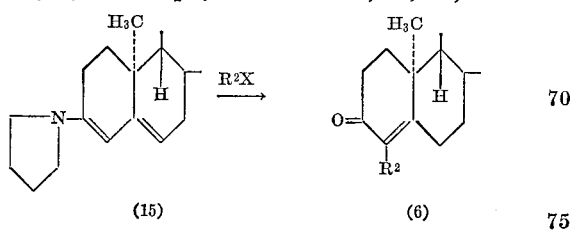

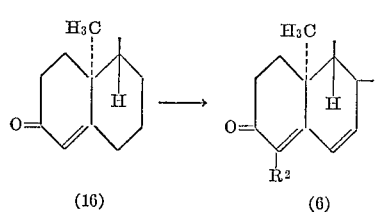

This mode of operation is particularly adopted to the introduction of two alkyl substituents into the 4-position, if the alkylating agent is used in excess, suitably in a four to sixfold excess.

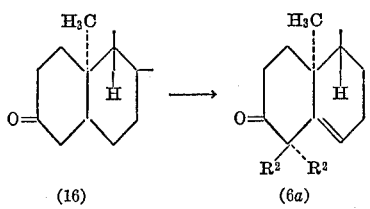

(h) An enol lactone of the partial structure (19) is reacted with an alkyl magnesium halide containing at least 2 C-atoms and the reaction product is subsequently converted into the 3-keto-Δ⁴-R²-steroid (6) by treatment with a base (e.g. with sodium alcoholate) (see, for example, J. Am. Chem. Soc., 1957, 79, 2906).

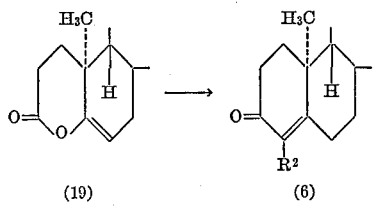

(i) An enamino ketone of partial structure (20) is converted into the 3-keto-Δ⁴-4-R²-steroid (6) with an alkyl halide R²X in the sense of the following reaction equation, via the compound (21) (see also U.S. Pat. No. 3,079,382).

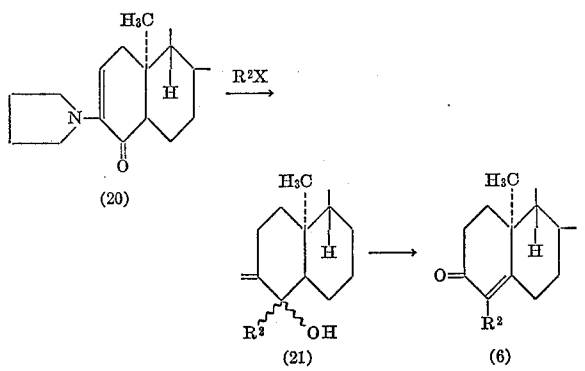

(k) A keto-enol ether of partial structure (22) is reacted with an alkyl magnesium halide R²MgX to give compound (21) which is converted into the corresponding 3-keto-Δ⁴-4-R²-steroid (6) by dehydration.

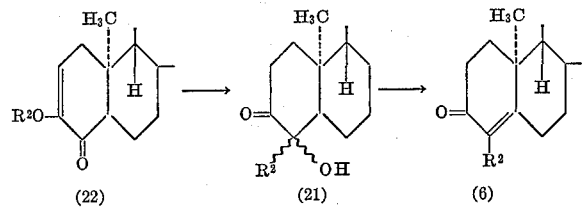

For the introduction of double bonds into the 6- and/or 1-position of 4-R²-Δ⁴-steroids obtained, the usual methods from the normal series of steroids can be used; for example, dehydrogenation with agents such as chloranil (J. Am. Chem. Soc., 1960, 82, 4293) or 2,3-dichloro-5,6-dicyanobenzoquinone (Proc. Chem. Soc., 1960, 14; Chem. and Ind., 1962, 211). The introduction of a Δ⁶-double bond can further be effected with manganese dioxide (J. Am. Chem. Soc., 1953, 75, 5932). The introduction of a Δ¹-double bond can be effected with iodine pentoxide or periodic acid, selenium dioxide (J. Am. Chem. Soc., 1959, 81, 5991) or lead tetraacetate (J. Am. Chem. Soc., 1955, 77, 661); Bull. Soc., 1958, 366) or in a microbiological manner (J. Am. Chem. Soc., 1955, 77, 4184).

The methods known from the chemistry of the normal steroids can likewise be used for the optional esterification or etherification of reaction products having free hydroxy groups, for the enol-etherification or esterification of the 3-keto-Δ⁴-system, as well as for the saponification of esterified hydroxy groups or the cleavage of etherified hydroxy groups.

The enol-esterification of 3-keto-Δ⁴- and 3-keto-Δ⁴,⁶-9β,10α-steroids as well as the esterification of free hydroxy groups can, for example, be effected by treatment with an acylating agent in the presence of a catalyst (e.g. with isopropenyl acetate in the presence of p-toluene-sulphonic acid).

The enol etherification of 3-keto-Δ⁴-4-R²-9β,10α-steroids obtained for the purpose of introducing the 3-alkoxy-Δ³,⁵-system as well as the etherification of free hydroxy groups can, for example, be effected as follows:

The 3-keto-Δ⁴-steroid obtained is reacted with an alcohol (e.g. methanol, ethanol, benzyl alcohol) in the presence of a catalyst (e.g. p-toluene-sulphonic acid) or with an orthoformic acid ester in the presence of a catalyst (e.g. with ethyl orthoformate and hydrochloric acid) or with a dialkoxy-propane (e.g. dimethoxy-propane) in methanol/dimethyl-formamide in the presence of a catalyst (such as p-toluene-sulphonic acid).

17-keto compounds can be reduced to the corresponding secondary alcohols. The reduction can be effected simultaneously with the reduction of the 3-keto group by means of a complex metal hydride (e.g. lithium aluminum hydride). The subsequent reoxidation of the 3-hydroxy group (e.g. with magnanese dioxide or 2,3-dichloro-5,6-dicyanobenzoquinone) yields the 3-keto-4-R²-17β-hydroxy-steroid. The 17-keto group can also be selectively reduced with a complex metal hydride (e.g. with tri-tert. butoxy lithium aluminum hydride) to yield the corresponding 17-hydroxy compound.

The starting compounds of Formula II, insofar as they are not known, can be produced in accordance with methods known per se.

Preferred starting materials for the manufacture of steroids of the general Formula I are the 3-keto-Δ⁴-9β,10α-steroids of the general formula

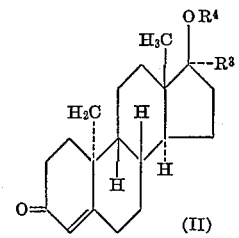

(II)

wherein R³ and R⁴ have the meanings as given above.

According to a preferred manufacturing process, a compound of the general Formula II is reacted in the presence of a proton acceptor such as a strong base (e.g. an alkali alcoholate, especially potassium tert. butylate in tert. butanol) with an alkylating agent such as an alkyl halide (e.g. methyl, ethyl, propyl, isopropyl bromide or iodide to give a 3-keto-Δ⁴-4-R²-9β,10α-steroid of the general formula

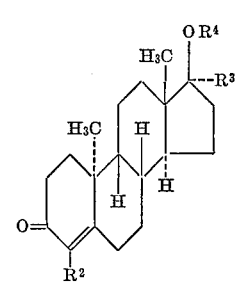

(IIIa)

wherein R², R³ and R⁴ have the above significance.

The reaction of the starting steroid of Formula II with the alkylating agent is preferably carried out by portionwise addition to the steroid at elevated temperature, preferably at reflux temperature and in an inert gas atmosphere (e.g. under nitrogen).

As already mentioned, the use of a larger excess, e.g.

a twofold, preferably a four to sixfold molar amount of the alkylating agent, leads to the 4,4-disubstituted compounds of the formula

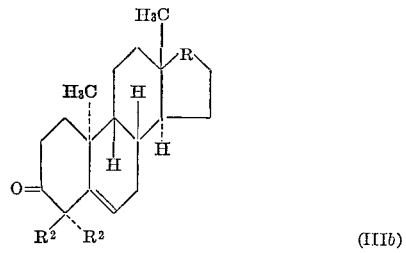

According to a further preferred manufacturing process, a compound of the general Formula II is reacted with formaldehyde and a thiol in the presence of a base to give the corresponding 4-thiomethyl compound which is reductively desulphurized to the corresponding 4-methyl compound. Preferably, thiophenyl is used as the thiol and the condensation is carried out at reflux temperature under nitrogen. As the base there is preferably used triethanolamine which can simultaneously serve as the solvent. The desulphurization can be effected by heating in the presence of a Raney catalyst (e.g. deactivated Raney nickel) in an organic solvent, especially acetone.

According to a further preferred manufacturing process, a compound of the general Formula II is converted into a 3-enamine, which is then reacted with an alkylating agent, especially an alkyl halide. The 3-enamino-4-R²-compound obtained is hydrolysed to give a 3-keto-Δ⁴-R²-9β,10α-steroid of the general Formula III. Preferably, the compound of general Formula III is reacted with pyrrolidine in an inert gas atmosphere (e.g. under nitrogen) at reflux temperature. The reaction of the 3-enamine with the alkylating agent as well as the hydrolysis of the enamino group is preferably carried out in dimethyl-formamide as the solvent.

The novel 4-alkyl-9β,10α-steroids of Formula I are compounds with hormonal action. They differ from the known steroids of the normal series in that in vivo they are degraded differently from these and do not reach the body hormone pool. They show specific hormone activity (e.g. differentiated antigonadotrophic properties) which makes possible an objective hormone treatment in oral or parenteral form without having to make allowance for the disadvantage of undesired hormonal side-effects in doing so.

These novel steroids of this invention may be used in the treatment of pubertas praecox, virility problems and as a means for differential chemical hypophysectomy. The novel steroids may be employed in the same manner as hormonal compounds having a pituitary inhibition activity such as androgens for example testosterone, estrogens such as estradiol, and those progestative compounds showing a pituitary inhibition such as prednisone in a dosage which may vary from 100γ–20 mg. per day.

The compounds of this invention may be used as medicaments in the form of pharmaceutical preparations, which contain the compounds, in admixture with a pharmaceutical organic or inorganic, solid or liquid carrier suitable for external, e.g. oral or parenteral administration. For making up the preparations there may be employed substances which do not react with the compounds, such as water, gelatine, lactose, starches, magnesium stearate, talc, vegetable oils, gums, polyalkylene glycols, petroleum jelly or any other known carrier used for the preparation of medicaments. The pharmaceutical preparations may be in solid form, for example as tablets, dragees, suppositories or capsules, or in liquid form, for example as solutions, emulsions or suspensions. If desired, they may be sterilized and/or contain auxiliary substances, such as preserving agents, stabilizing agents, wetting or emulsifying agents, salts for varying the osmotic pressure or buffers. They may also contain, in combination, other therapeutically useful substances.

In the following examples temperatures are stated in degrees centigrade.

EXAMPLE 1

5.0 g. of 3-pyrrolidino-9β,10α-androsta-3,5-dien-17-one were dissolved in 50 ml. of dimethyl-formamide. After the addition of 20 ml. of methyl iodide, the mixture was heated at 50° for 2½ hours and 30 ml. of 2 N caustic soda were added. The mixture was further heated for 45 minutes at 50°, then cooled, poured on ice-water and extracted with 250 ml. of ether/methylene chloride (3:1) in three portions. The extraction solutions were consecutively washed with dilute hydrochloric acid, dilute caustic soda and water, dried with sodium sulphate and evaporated in vacuum. The residue was then chromatographed on 80 g. of aluminum oxide (activity grade II). The petroleum ether/benzene (2:1) fractions were combined and recrystallized from acetone/hexane. The so-obtained 4-methyl-9β,10α-androst-4-en-3,17-dione melted at 105–106°. U.V.: $\gamma_{max.}$ 248.5 mμ, $\epsilon$=15,400; $[\alpha]_D^{25°}$=—22° (in dioxane).

The 3-pyrrolidino-9β,10α-androsta-3,5-dien-17-one used as the starting material was prepared as follows:

1.6 ml. of pyrrolidine were added under nitrogen to a boiling solution of 3 g. of 9β,10α-androst-4-en-3,17-dione in 30 ml. of methanol. The mixture was boiled for 10 minutes, thereafter kept for 1 hour at room temperature and finally crystallized with cooling. There were obtained 3.31 g. of 3-pyrrolidino-9β,10α-androsta-3,5-dien-17-one.

EXAMPLE 2

300 mg. of 4-methyl-9β,10α-androst-4-en-3,17-dione (obtained in accordance with Example 1) and 30 mg. of p-toluene-sulphonic acid were dissolved in 10 ml. of absolute benzene. After distilling off 4 ml. of benzene, a mixture of 10 ml. of benzene and 5 ml. of isopropenyl acetate was added dropwise in the course of 5 hours, during which 15 ml. of benzene were simultaneously distilled off via a Vigreux column. The reaction mixture was then cooled, diluted with 10 ml. of ether and treated with 0.02 ml. of pyridine. The mixture was allowed to stand for 15 minutes, the precipitate which separated out was filtered off and the filtrate was concentrated in vacuum. The residue was recrystallized from methanol which contained 0.5% pyridine. There were obtained 150 mg. of colorless crystals of 4-methyl-3-acetoxy-9β,10α-androsta-3,5-dien-17-one, of melting point 121–123°. U.V.: $\lambda_{max.}$ 234 mμ, $\epsilon$=18,500.

EXAMPLE 3

A solution of 4-methyl-9β,10α-androst-4-en-3,17-dione (obtained in accordance with Example 1) in 15 ml. of absolute tetrahydrofuran was added dropwise, with stirring, to a solution of 500 mg. of lithium aluminum hydride in 40 ml. of absolute tetrahydrofuran. Thereafter, the mixture was heated to reflux for 1 hour, then cooled and the excess lithium aluminum hydride was decomposed by the addition of 50 ml. of moist ether and 5 ml. of saturated sodium sulphate solution. The mixture was further stirred for 15 minutes and the granular precipitate was filtered off and well rinsed with methylene chloride. After evaporation of the filtrate in vacuum, there was obtained 1 g. of crude 4-methyl-3ξ,17β-dihydroxy-9β,10α-androst-4-ene in the form of a white foam which was dissolved in 30 ml. of absolute dioxane. 1 g. of 2,3-dichloro-5,6-dicyano-benzoquinone was added and the solution was allowed to stand overnight at room temperature. The reaction mixture was then diluted with 30 ml. of benzene, charged into a column of 10 g. of aluminum oxide and eluted with 50 ml. of ether/benzene (1:1). The eluate was evaporated to dryness in vacuum. After recrystallization of the residue from acetone/isopropyl ether there were obtained 250 mg. of colorless crystals of 4-methyl-17β-hydroxy-9β,10α- androst - 4 - en - 3 - one of melting point 123–134°; $[\alpha]_D^{25°}=135°$ (in dioxane); U.V.: $\lambda_{max.}$ 251 mμ, ε=15,600.

EXAMPLE 4

A mixture of 10 g. of 9β,10α-testosterone, 8 g. of thiophenol, 8 g. of paraformaldehyde and 20 g. of triethanolamine was heated to reflux under nitrogen for 16 hours (bath-temperature about 120°). The mixture was cooled, poured on ice-water and extracted three times with ether. The ether extracts were washed consecutively with dilute hydrochloric acid, dilute caustic soda and water. The combined ether solutions were dried with sodium sulphate and concentrated in vacuum. There were obtained 16 g. of amorphous material which, dissolved in benzene, was filtered through 160 g. of aluminum oxide. The benzene eluates yielded 7.4 g. of almost pure, amorphous 17β - hydroxy - 4-phenylthiomethyl-9β,10α-androst-4-en-4-one (ε=252mμ=16,100).

100 g. of Raney nickel were suspended in 250 ml. of acetone and deactivated by heating at reflux for 30 minutes. The 17β - hydroxy - 4-phenylthiomethyl-9β,10α-androst-4-en-3-one obtained was added and the mixture was heated under reflux for 3 hours. The reaction mixture was then filtered, the filtrate concentrated in vacuum and the residue chromatographed on 150 g. of aluminum oxide (activity grade II). 800 mg. of 4-methyl-9β,10α-androst - 4 - en - 3,17 - dione were eluted with petroleum ether/benzene (1:1). The benzene/ether (1:1) fractions yielded 1.8 g. of 4-methyl-17β-hydroxy-9β,10α-androst-4-en-3-one of melting point 120–122°.

EXAMPLE 5

6.1 g. of potassium were dissolved in 300 ml. of absolute tert. butanol. To this solution 30 g. of 9β,10α-testosterone in 400 ml. of absolute tert. butanol was added. A solution of 22 g. of methyl iodide in 1500 ml. of absolute tert. butanol was then added dropwise in a nitrogen atmosphere at boiling temperature with stirring in the course of 2.5 hours. Subsequently the mixture was heated to reflux for a further 30 minutes, then cooled and treated with 110 ml. of 2 N hydrochloric acid. The greater part of the tert. butanol was thereupon evaporated in vacuum and the residue poured into ice-water and extracted with ether. The ether extract was washed neutral with water, dried over sodium sulphate and evaporated. The residue was chromatographed on 2 kg. of silica gel. With benzene/acetic ester (5:1) there were eluted 12 g. of a product which yielded 8 g. of pure 4-methyl-17β-hydroxy-9β,10α-androst-4-en-3-one when recrystallized from acetone/isopropyl ether.

EXAMPLE 6

0.65 g. of 4-methyl-17β-hydroxy-9β,10α - androst - 4-en-3-one (obtained in accordance with Example 3, 4 or 5) were dissolved in 15 ml. of dioxan containing 6.5% (w./v.) of HCl gas. A solution of 0.65 g. of 2,3-dichloro-5,6-dicyano-benzoquinone in 15 ml. of dioxan containing 6.5% of HCl gas was added dropwise thereto with vigorous stirring in the course of two minutes. The reaction mixture was stirred for a further 30 minutes at room temperature and then neutralized by careful addition of sodium bicarbonate. The neutralized reaction mixture was heated at reflux for 1 hour, then cooled, diluted with 20 ml. of benzene and filtered over 10 g. of aluminum oxide. After elution with ether the eluate was evaporated to dryness in vacuum and the residue was chromatographed on 25 g. of aluminum oxide. With benzene/ether (6:1) there were eluted 300 mg. of pure 4-methyl-17β-hydroxy-9β,10α - androsta - 4,6-dien-3-one which melted at 154–156° (from acetone/hexane); $[\alpha]_D^{25°}=-607°$ (in dioxane). U.S. $\lambda_{max}$ 291 mμ, ε=24,700.

EXAMPLE 7

A solution of 3.5 g. of 2,3-dichloro-5,6-dicyano-benzoquinone in 60 ml. of dioxane which contained 1% of HCl gas was added to a solution of 4.5 g. of 4-methyl-17β-hydroxy-9β,10α-androsta-4,6-dien - 3 - one (obtained in accordance with Example 6) in 60 ml. of dioxane wherein 60 mg. of HCl gas were dissolved. The reaction mixture was stirred for 1.5 hours at room temperature, then treated with 1.1 g. of sodium bicarbonate and heated to reflux for 30 minutes. The cooled reaction mixture was filtered through a column of 70 g. of aluminum oxide, the substance was eluted with benzene/ether (1:1) and the eluate was evaporated to dryness in vacuum. There were thus obtained 3.4 g. of crude crystals which yielded 2.6 g. of 4 - methyl-17β-hydroxy-9β,10α-androsta-1,4,6-trien-3-one of melting point 180–181° (from acetone/isopropyl ether); $[\alpha]_D^{25°}=-296°$ (in dioxane); U.V.: $\lambda_{max.}=225$ mμ (ε=13,500); $\lambda_{max.}=252$ mμ (ε=7,200, shoulder); $\lambda_{max.}=308$ mμ (ε=9,700).

EXAMPLE 8

A mixture of 0.5 g. of 4-methyl-17β-hydroxy-9β,10α-androsta-4,6-dien-3-one (obtained in accordance with Example 6), 50 mg. of p-toluene-sulphonic acid, 30 ml. of absolute benzene and 10 ml. of isopropenyl acetate was heated to reflux for 8 hours. The reaction mixture was diluted with 50 ml. of petroleum ether and charged into a column of 10 g. of aluminum oxide. The substance was diluted with benzene/petroleum ether (2:1). 500 mg. of yellowish crystals were obtained, which yielded 3,17β-diacetoxy-4-methyl-9β,10α - androsta - 2,4,6 - triene of melting point 138–140° (from methanol containing 0.5% of pyridine); $[\alpha]_D^{25°}=-348°$ (in dioxane). U.V.:

$$\lambda_{max.}\ 306\ m\mu,\ \varepsilon=11,900.$$

EXAMPLE 9

By a procedure analogous to that of Example 5 using ethyl iodide as the alkylating agent there was obtained from 17α-methyl-17β-hydroxy-9β,10α-androst - 4 - en-3-one the compound 4 - ethyl - 17α-methyl-17β-hydroxy-9β,10α-androst - 4 - en-3-one of melting point 161–162°, when recrystallized from acetone/isopropyl ether. U.V.: $\lambda_{max.}$ 250 mμ, ε=15,900; $[\alpha]_D^{25°}=-151°$ (in dioxane).

EXAMPLE 10

By a procedure analogous to that of Example 6, there was prepared from 4 - ethyl - 17α-methyl-17β-hydroxy-9β,10α-androst-4-en-3-one (obtained in accordance with Example 14) the compound 4-ethyl-17α-methyl-17β-hydroxy-9β,10α-androsta-4,6-dien - 3 - one of melting point 176–177° (from acetone/hexane); U.V.: $\lambda_{max.}$ 291 mμ, ε=22,400; $[\alpha]_D^{25°}=-563°$ (in dioxane).

EXAMPLE 11

By a procedure analogous to that of Example 7 there was obtained from 4-ethyl-17α - methyl - 17β-hydroxy-9β,10α-androsta-4,6-dien - 3 - one, the compound 4-ethyl-17α-methyl-17β-hydroxy-9β,10α-androsta - 1,4,6 - trien-3-one of melting point 196–197°. U.V.: $\lambda_{max.}$ 225 (ε=1,500); $\lambda_{max.}$ 308 (ε=10,800); $\lambda_{max.}$ 252 mμ, (ε=8,100); $[\alpha]_D^{25°}=-406°$ (in dioxane).

EXAMPLE 12

By a procedure analogous to that of Example 8 there was obtained from 4 - ethyl - 17α-methyl-17β-hydroxy-9β,10α - androst - 4 - en - 3 - one the compound 4 - ethyl-17α-methyl-3,17-diacetoxy-9β,10α-androsta - 3,5 - diene melting at 85–86° (from methanol). U.V.: $\lambda_{max.}$ 235 mμ, ε=1,300; $[\alpha]_D^{25°}=+9°$ (in dioxane).

EXAMPLE 13

By a procedure analogous to that of Example 5 using n-propyl iodide as the alkylating agent there was obtained from 17α - methyl - 17β-hydroxy-9β,10α-androst-4-en-3-one the compound 4-n-propyl - 17α - methyl-17β-hydroxy-9β,10α-androst - 4 - en-3-one of melting point 112–113°. U.V.: $\lambda_{max.}$; 250 mμ, ε=15,400. $[\alpha]_D^{25°}=-148°$ (in dioxane).

EXAMPLE 14

By a procedure analogous to that of Example 6 there was prepared from 4 - n - propyl-17α-methyl-17β-hydroxy-9β,10α-androst - 4 - en-3-one the compound 4-n-propyl - 17α - methyl-17β-hydroxy-9β,10α-androsta-4,6-dien-3-one of melting point 128–129°. U.V.: $\lambda_{max}$. 292 mμ, ε=24,000; $[\alpha]_D^{25°}$=551° (in dioxane).

EXAMPLE 15

A solution of 2.87 g. of 17β-hydroxy-9β,10α-androst-4-en-3-one, 5.5 g. of methyl iodide and 5.1 g. of potassium tert. butylate in 100 ml. of tert. butanol was refluxed for 3 hours under nitrogen. The reaction mixture was poured on ice-water, acidified with 2 N hydrochloric acid and extracted with methylene chloride. The organic extract was washed with sodium carbonate and water, dried over sodium sulfate and evaporated to dryness in vacuum. The residue was dissolved in benzene/ethyl acetate and gave on chromatography on silica gel. 4,4-dimethyl - 17β - hydroxy-9β,10α-androst-5-en-3-one. Melting point 143–144° (from acetone/isopropyl ether), $[\alpha]_D^{25°}$=−10° (in dioxane).

EXAMPLE 16

By a procedure analogous to that of Example 15 using ethyl iodide as the alkylating agent there was prepared from 17α - methyl - 17β-hydroxy-9β,10α-androst-4-en-3-one the compound 4,4-diethyl-17α-methyl-17β-hydroxy-9β,10α-androst - 5 - en-3-one. Melting point 115–116°, $[\alpha]_D^{25°}$=−5° (in dioxane).

EXAMPLE 17

Tablet

| | Mg. |
|---|---|
| Active ingredient (e.g. 4,17α-dimethyl-17β-hydroxy-9β,10α-androsta-4,6-dien-3-one) | 1 |
| Lactose | 75 |
| Starch | 72.5 |
| Talc | 1.35 |
| Magnesium stearate | 0.15 |
| Total weight | 150.00 |

While we have described our invention in connection with specific embodiments and applications, other modifications thereof will be readily apparent to those skilled in this art without departing from the spirit and scope of the invention as defined in the appended claims.

What we claim is:

1. A steroid selected from the group consisting of 4-ethyl-17α-methyl - 17β - hydroxy-9β,10α-androsta - 4,6-diene - 3 - one, 4-n-propyl-17α-methyl-17β-hydroxy-9β10α-androsta - 4,6 - diene-3-one, 4-ethyl-17α-methyl-17β-hydroxy-9β,10α-androsta - 1,4,6 - triene-3-one, 4 - ethyl-3,17β-diacetoxy - 17α - methyl-9β,10α-androsta-3,5-diene, 4,4-diethyl - 17α - ethyl-17β-hydroxy-9β,10α-androsta-5-ene-3-one.

2. As the steroid of claim 1 the steroid 4-ethyl-17α-methyl-17β-hydroxy-9β,10α-androsta-4,6-diene-3-one.

3. As the steroid of claim 1 the steroid 4-n-propyl-17α-methyl-17β-hydroxy-9β,10α-androsta-4,6-diene-3-one.

4. As the steroid of claim 1, the steroid 4-ethyl-17α-methyl-17β-hydroxy-9β,10α-androsta-1,4,6-triene-3 - one.

5. As the steroid of claim 1, the steroid 4-ethyl-3,17β-diacetoxy-17α-methyl-9β,10α-androsta-3,5-diene.

6. As the steroid of claim 1, the steroid 4,4-diethyl-17α-ethyl-17β-hydroxy-9β,10α-androst-5-ene-3-one.

References Cited

UNITED STATES PATENTS 2,844,602  7/1958  Ringold et al. _____ 260—397.4

OTHER REFERENCES

Chem. and Ind. (1961) by Schaub et al., p. 2003 relied on.

ELBERT ROBERTS, Primary Examiner

U.S. Cl. X.R.

260—239.5; 397.3; 397.5

PO-1050
(5/69)

UNITED STATES PATENT OFFICE
CERTIFICATE OF CORRECTION

Patent No. 3,523,958     Dated August 11, 1970

Inventor(s) ENGBERT HARMEN REERINK ET AL

It is certified that error appears in the above-identified patent and that said Letters Patent are hereby corrected as shown below:

Column 2, line 5, "acidic" should read -- acid --.

Column 9, line 1, "134°" should read -- 124° --.

line 18, "4-one" should read -- 3-one --.

Column 10, line 15, "$\varepsilon = 13,500$" should read -- $\lambda = 13,500$ --.

Column 12, line 9, "9β10α" should be -- 9β, 10α --.

Signed and sealed this 16th day of April 1974.

(SEAL)
Attest:

EDWARD M. FLETCHER, JR.
Attesting Officer

C. MARSHALL DANN
Commissioner of Patents